United States Patent [19]

Boyland

[11] Patent Number: 5,205,687
[45] Date of Patent: Apr. 27, 1993

[54] METHOD FOR SECURING LOAD USING ROPE TYING DEVICE

[76] Inventor: Russell Boyland, 136 Evans Road, Wilberforce 2756, Australia

[21] Appl. No.: 793,497

[22] Filed: Nov. 14, 1991

Related U.S. Application Data

[63] Continuation of Ser. No. 445,684, Jul. 13, 1990, abandoned.

[30] Foreign Application Priority Data

Mar. 24, 1988 [AU] Australia .................. P17423

[51] Int. Cl.$^5$ ................................ B60P 1/64
[52] U.S. Cl. ............................. 410/98; 24/130
[58] Field of Search ................. 24/129 R, 130; 410/96-98

[56] References Cited

U.S. PATENT DOCUMENTS

| | | | |
|---|---|---|---|
| 393,062 | 11/1988 | Fay | 24/130 X |
| 904,747 | 11/1908 | Anderson | 24/130 |
| 1,565,041 | 12/1925 | Arney | 24/129 R |
| 1,670,257 | 5/1928 | Hagen | 24/130 |
| 1,714,770 | 5/1929 | Finn | 24/129 R |
| 2,386,836 | 10/1945 | Blagden | 24/129 R |
| 3,675,276 | 7/1972 | Nuse | 24/130 |

FOREIGN PATENT DOCUMENTS 2350495 4/1975 Fed. Rep. of Germany ........ 24/130

*Primary Examiner*—James R. Brittain
*Attorney, Agent, or Firm*—Morrison & Foerster

[57] ABSTRACT

A device to assist manual tightening of a rope passed over a load on a vehicle. In use the device is first attached to the rope by passing the rope over ridge (14), through hole (13) and around neck (18); tensioning may then be achieved by pulling on the rope, after it has been looped (by 180 degrees) around a fixed anchorage on the vehicle and then around hook-like tensioner (15). The taut rope is secured by again passing it around a fixed anchorage point and then winding it around neck (19) and under the rope lying between ridge (14) and a hole (13). An alternative device has two tensioners (15) and is used similarly to the above.

3 Claims, 3 Drawing Sheets

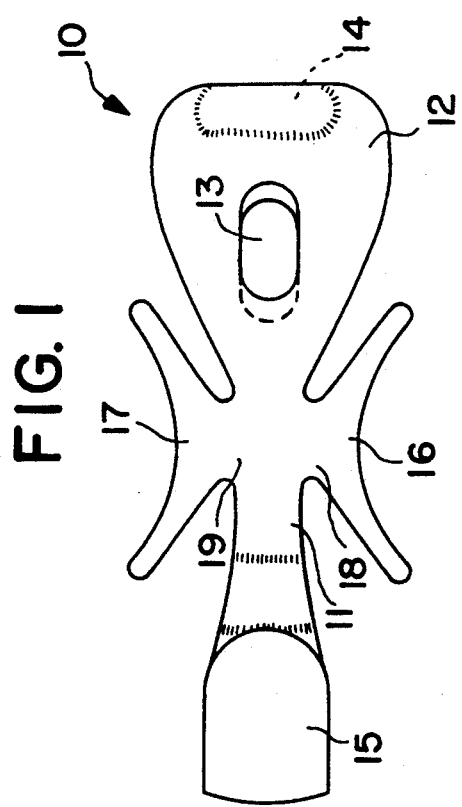
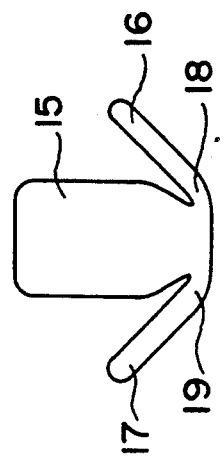
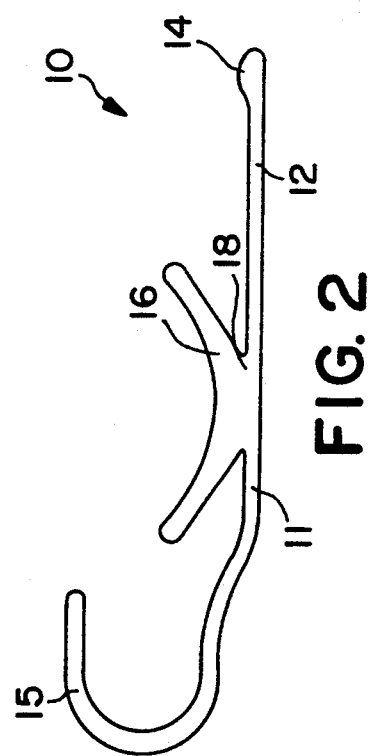

METHOD FOR SECURING LOAD USING ROPE TYING DEVICE

This application is a continuation of application Ser. No. 445,684, filed Jul. 13, 1990, abandoned.

FIELD OF THE INVENTION

This invention relates to a device for securely tightening a rope across a load.

BACKGROUND ART

Commonly, the payload on trucks is stabilieed by the process of tying one end of a rope to one fixed point of the truck, extending the other end of the rope around the load, looping the rope about a fixed receiving point, then securely tightening the rope around the load by tying a hitch knot back at a point along the length of the rope. However, the jolting motion of the truck causes the load to exert a force against the rope, leading to a loosening of the grip of the knot. The risk of the load moving independently of the truck poses a foreseeable risk of danger. Furthermore, the knot itself may threaten to interfere with vehicles passing nearby. For instance the loop of the hitch knot normally extends some distance from the side of the truck when not properly concealed, and can attach to vehicles passing in close proximity.

DISCLOSURE OF THE INVENTION

It is a object of the present invention to overcome or substantially ameliorate the abovementioned disadvantages.

The present invention provides a device for securely tightening the free end of a rope across a load, which device comprises a rope fixing means, a tensioning means and a receiving means, the arrangement being such that a portion of the free end of the rope is fixed to the fixing means and the free end of the rope is passed around a first anchor site external of the device and then a portion of the free end of the rope downstream thereof engages on the tensioning means whereby the rope is maintained under tension and the remaining free end of the rope is passed around a second anchor site external of the device and then secured to the receiving means.

Optionally, the device may include more than one tensioning means. Where the device includes two tensioning means, the arrangement is such that after a portion of the free end of the rope is fixed to the fixing means and the free end of the rope is passed around a first anchor site external of the device with a portion of the free end of the rope downstream thereof being engaged on a first tensioning means and maintained thereon under tension, the remaining free end of the rope is passed around a second anchor site external of the device and a portion of the free end of the rope downstream thereof engages on the second tensioning means and is maintained thereon under further tension before being passed around a third anchor means external of the device and being secured to the receiving means.

The device may be permanently fixed to the rope or be capable of separation therefrom.

BRIEF DESCRIPTION OF THE DRAWINGS

In order that the invention may be more readily understood and put into practical effect, reference will now be made to the accompanying drawings of a preferred embodiment of the invention, in which:

FIG. 1 is a plan view of a rope tying device.

FIG. 2 is a side view of the device of FIG. 1.

FIG. 3 is an end view as seen from the left hand side of the device of FIG. 2.

DESCRIPTION OF THE PREFERRED EMBODIMENT

Figure 4:
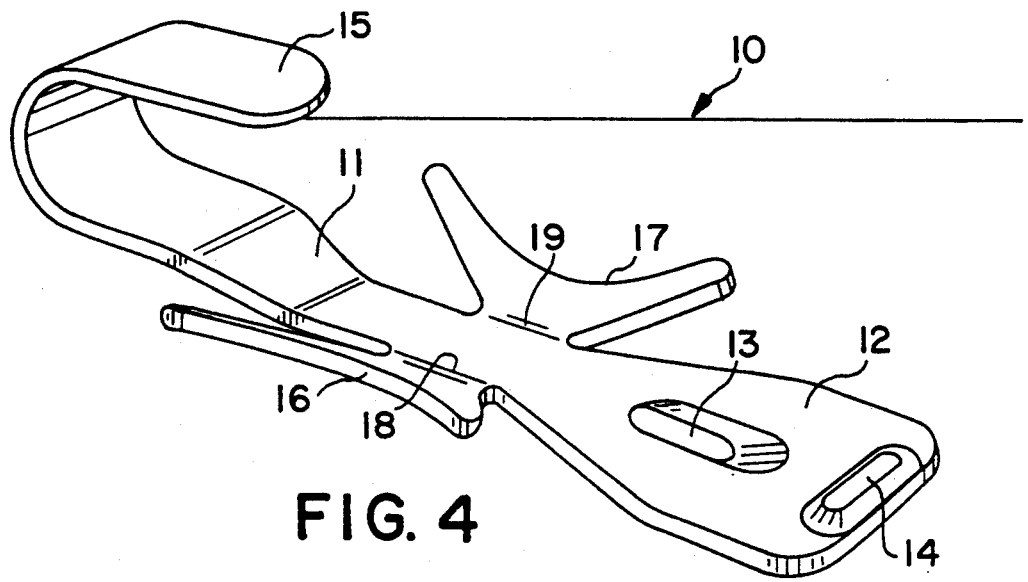
FIG. 4 is a perspective view of the device of FIGS. 1, 2 and 3.

The rope tying device 10 shown in FIGS. 1 to 4 consists of an elongated rib 11 having at one end an enlarged head portion 12 containing an aperture 13 and ridge 14 and having at the other end a hook 15. Between the head portion 12 and hook 15 and on both sides of the rib 11 are winged portions 16 and 17 fixed to the rib 11 by respective necks 18 and 19. FIGS. 2, 3 and 4 show that the ridge 14, hook 15 and winged portions 16 and 17 are raised above the plane of the rib 11.

Figure 5:
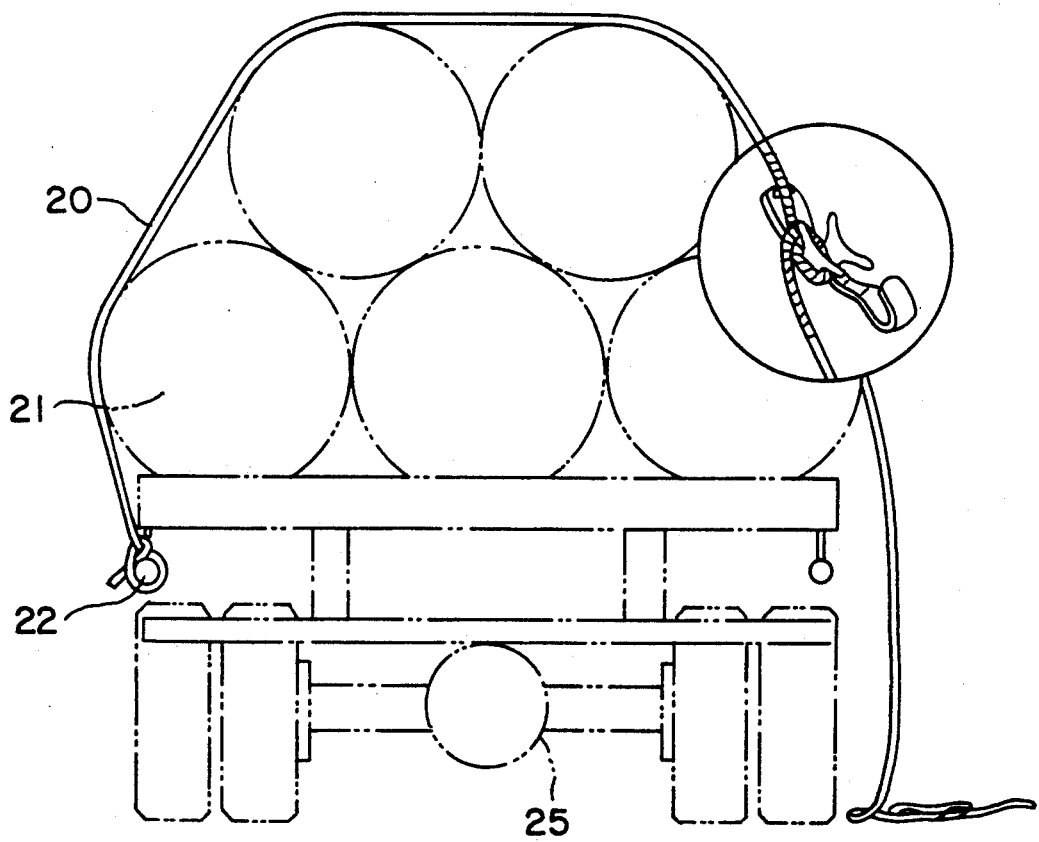
FIG. 5 is a view from the end of a vehicle supporting a load where there is a rope passed over the load and the device of FIGS. 1 to 4 is fixed to the rope and is shown enlarged.
Figure 6:
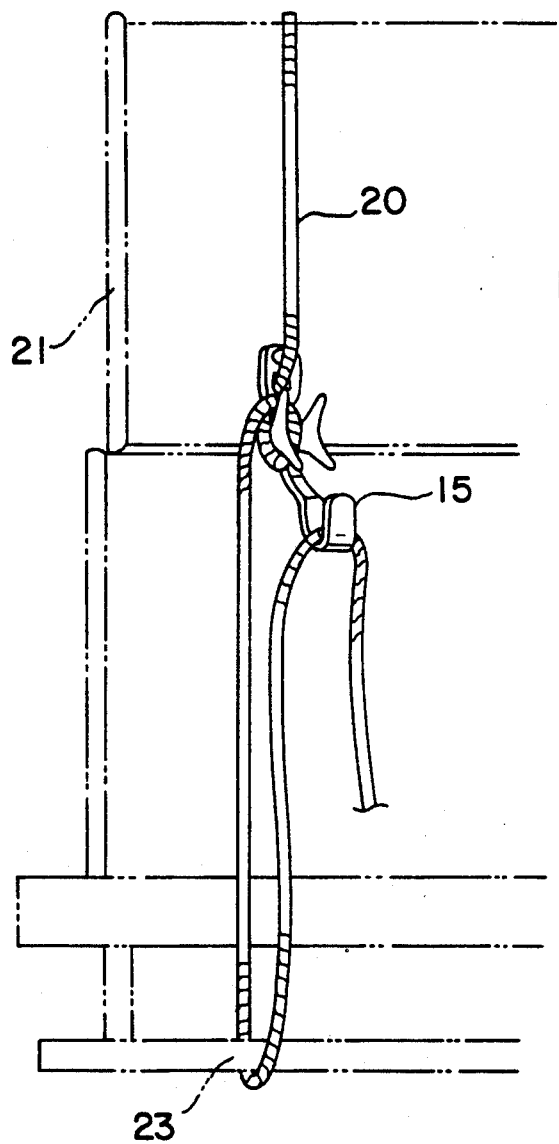
FIG. 6 is a view of a portion of the load supported on the vehicle of FIG. 5 with the rope, to which the device is fixed, being passed thereover and the remaining portion of the rope shown in a partly completed load tightening arrangement.
Figure 7:
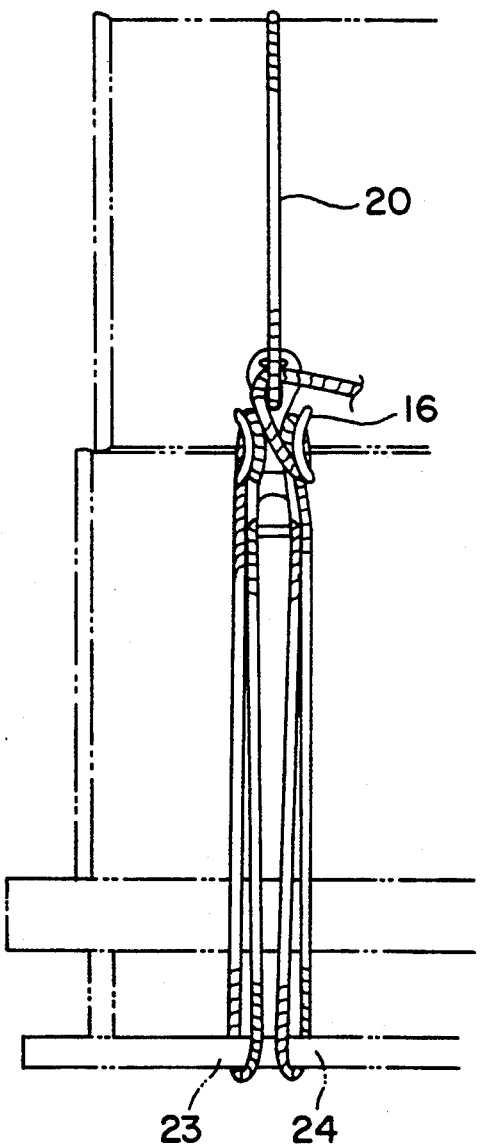
FIG. 7 is a view similar to that of FIG. 6 that shows the remaining portion of the rope in a completed load tightening arrangement.

FIGS. 5 to 7 show a procedure for using the device of FIGS. 1 to 4 to securely tighten a rope 20 about a load 21 carried on a vehicle 25, which rope 20 is tied at one end to the vehicle at a first anchor site 22, is slung across the load 21 and left untied at its other end situated at the opposite side of the load 21. The rope 20 is preferably of a diameter that will fit tightly in the recess between the head portion 12 and any of the winged portions 16 or 17.

As shown in FIG. 5, and referring to the features enumerated in FIG. 4, a length of the free end of the rope 20 is fed over ridge 14, through the aperture 13 and a portion thereof is tightly looped through a 360° angle around neck 19 of the winged portion 17. In this configuration, the device 10 is restricted from moving along the length of the rope 20 and so the aperture 13, ridge 14 and winged portion 17 co-operate to serve as the fixing means.

Referring to FIG. 6, the free end of the rope 20 is then looped through an angle of 180° about a second anchor site 23 of the vehicle, and then looped through an angle of 180° about the hook 15. The hook 15 serves as the tensioning means.

The free end of the rope 20 is then pulled in the direction of the axis of the rib 11 away from the device 10 so as to bring the device 10 closer to the second anchor site 23, thereby increasing the tension of the rope 20 about the load 21.

Whilst at its desired tension, FIG. 7 shows that the remaining end of the rope 20 is looped through an angle of 180° about a third anchor site 24 of the vehicle 25 and then secured to the device 10 by firstly being looped through an angle of 360° around the neck 18 of the winged portion 16 and then having the remaining short leading portion of the rope 20 fed between the head portion 12 and the portion of the rope 20 that rests upon the head portion 12 down from the ridge 14. The winged portion 16, the ridge 14 and the rope threaded through aperture 13 and over ridge 14 when under tension co-operate to serve as the receiving means.

It is apparent that the length of the free end of the rope from the site at which the device 10 is fixed to the rope must be sufficient to enable the user to perform the manipulations suggested as above.

When the device 10 is in operation across a load the device maintains the desired tension on the rope, thereby effectively restricting independent movement of the load.

Various modifications may be made in details of design and construction without departing from the scope or ambit of the invention.

I claim:

1. A method for securing a load to a loadbed using a rope tying device and a rope, said loadbed having at least three rope anchoring sites, said rope tying device comprising:

rope fixing means for attaching said rope to said device;

tensioning means for receiving a loop of said rope; receiving means for securing a free end of said rope;

said rope fixing means including an opening for threading said rope through and a first double hook for looping said rope around thereby affixing said device to a desired location of said rope and dividing said rope into a secured section between said device and a first end of said rope tied a first said anchoring site, and a free end section; said tensioning means including a single hook for receiving said loop of said rope; said receiving means including a second double hook for looping said free end of said rope around, thereby securing said free end of said rope to said device, said method including the steps of
a) securing one end of the rope to said first anchoring site;
b) threading said rope through the opening of said device until said device is located at a predetermined location of said rope;
c) winding said rope around the first double hook of said device;
d) connecting said rope to a second and a third anchoring site of said loadbed thereby providing a rope loop therebetween;
e) placing said rope loop over said tensioning hook of said device and applying tension to said rope; and
f) winding said free end of said rope around the second double hook of said device.

2. A method for securing a load to a loadbed using a rope tying device and a rope, said loadbed having at least three rope anchoring sites, said rope tying device comprising:

rope fixing means for attaching said rope to said device;

tensioning means for receiving a loop of said rope; receiving means for securing a free end of said rope;

said rope fixing means including an opening for threading said rope through and a first double hook for looping said rope around thereby affixing said device to a desired location of said rope and dividing said rope into a secured section between said device and a first end of said rope tied a first said anchoring site, and a free end section; said tensioning means including a single hook for receiving said loop of said rope;

said receiving means including a second double hook for looping said free end of said rope around, thereby securing said free end of said rope to said device, said receiving means further includes a ridge separated from said opening by a space in the direction towards said first end of said rope tied to said first anchoring site, said space being provided for receiving said free end of said rope after it has been looped around said second double hook and securing it between said device and said secured section of said rope when said rope is under tension, said method including the steps of
a) securing one end of the rope to said first anchoring site;
b) threading said rope through the opening of said device until said device is located at a predetermined location of said rope;
c) winding said rope around the first double hook of said device;
d) connecting said rope to a second and a third anchoring site of said loadbed thereby providing a rope loop therebetween;
e) placing said rope loop over said tensioning hook of said device and applying tension to said rope; and
f) winding said free end of said rope around the second double hook of said device.

3. The method for securing a load to a loadbed as claimed in claim 2, said method further including the step of securing the free end into said space between the secured section of said rope, said opening and said ridge.

* * * * *